US012736668B2

(12) United States Patent
Park et al.

(10) Patent No.: US 12,736,668 B2
(45) Date of Patent: Sep. 15, 2026

(54) APPARATUS FOR VEHICLE

(71) Applicant: HL KLEMOVE CORP., Incheon (KR)

(72) Inventors: Jonggyu Park, Gyeonggi-do (KR); Sangmin Kim, Gyeonggi-do (KR); Hanyeol Yu, Gyeonggi-do (KR); Hyeondong Cho, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 447 days.

(21) Appl. No.: 18/213,812

(22) Filed: Jun. 24, 2023

(65) Prior Publication Data

US 2024/0061102 A1 Feb. 22, 2024

(30) Foreign Application Priority Data

Aug. 16, 2022 (KR) ........................ 10-2022-0102004

(51) Int. Cl.
*G01S 13/931* (2020.01)
*G01S 7/03* (2006.01)

(52) U.S. Cl.
CPC .............. *G01S 13/931* (2013.01); *G01S 7/03* (2013.01); *G01S 2013/9318* (2020.01);
(Continued)

(58) Field of Classification Search
CPC ..................... G01S 13/931; G01S 7/03; G01S 2013/93185; G01S 2013/9318;
(Continued)

(56) References Cited

U.S. PATENT DOCUMENTS 8,717,224 B2 * 5/2014 Jeong .................. G01S 13/4463 342/93
9,917,355 B1 * 3/2018 Lee ........................ H01Q 21/20
(Continued)

FOREIGN PATENT DOCUMENTS

CN 112558104 3/2021
JP 2016-205821 12/2016
(Continued)

OTHER PUBLICATIONS

Office Action dated Sep. 30, 2024 for Korean Patent Application No. 10-2022-0102004 and its English translation provided by Applicant's foreign counsel.
(Continued)

*Primary Examiner* — Nazra Nur Waheed
(74) *Attorney, Agent, or Firm* — WOMBLE BOND DICKINSON (US) LLP

(57) ABSTRACT

An apparatus may include a radar module configured to provide information on an object around a vehicle and a controller configured to control at least one of a driving system, a braking system, and a steering system of the vehicle on the basis of the information on the object. The radar module may include a first antenna module installed at a front side of the vehicle, having a forward sensing area of the vehicle, and configured to obtain first radar data and a processor configured to obtain information on the object around the vehicle on the basis of processing the first radar data. The first antenna module may include a first substrate facing a front-right direction of the vehicle and a second substrate facing a front-left direction of the vehicle.

15 Claims, 11 Drawing Sheets

(52) U.S. Cl.
CPC ............... *G01S 2013/93185* (2020.01); *G01S 2013/9319* (2020.01); *G01S 2013/93271* (2020.01); *G01S 2013/93272* (2020.01); *G01S 2013/93274* (2020.01)

(58) Field of Classification Search
CPC . G01S 2013/93274; G01S 2013/93271; G01S 2013/93272; G01S 2013/9319
See application file for complete search history.

(56) References Cited

U.S. PATENT DOCUMENTS

| | | | | |
|---|---|---|---|---|
| 2012/0194377 | A1* | 8/2012 | Yukumatsu | G01S 13/347 342/368 |
| 2019/0302227 | A1* | 10/2019 | Shiozaki | H01Q 21/0075 |
| 2021/0063557 | A1* | 3/2021 | Yu | G01S 7/027 |
| 2021/0339685 | A1* | 11/2021 | Adams | H04N 23/57 |

FOREIGN PATENT DOCUMENTS

| | | |
|---|---|---|
| JP | 2019-219252 | 12/2019 |
| KR | 10-1513878 | 4/2015 |
| KR | 10-2021-0071451 | 6/2021 |
| KR | 10-2022-0052616 | 4/2022 |

OTHER PUBLICATIONS

Office Action (3rd) dated Mar. 27, 2026 for Korean Patent Application No. 10-2022-0102004 and its English translation provided by Applicant's foreign counsel.

* cited by examiner

APPARATUS FOR VEHICLE

CROSS-REFERENCE TO RELATED APPLICATION

This application claims the benefit of Korean Patent Application No. 10-2022-0102004, filed on Aug. 16, 2022 in the Korean Intellectual Property Office, the disclosure of which is incorporated herein by reference.

BACKGROUND

1. Field

Embodiments of the present disclosure relate to an apparatus including a plurality of radar modules.

2. Description of the Related Art

In modern society, vehicles are the most common means for transportation, and the number of people using the vehicles is increasing. With the development of vehicle technology, there are advantages of ease of long-distance travel, easier life, and the like, but in densely populated places such as Korea, there are problems that road traffic conditions degrade and serious traffic jams occur frequently.

Recently, studies on a vehicle on which an advanced driver assist system (ADAS) configured to actively provide information on a vehicle state, a driver state, and a surrounding environment to reduce the burden of the driver and improve convenience of the drive is mounted have actively been carried out.

As examples of the ADAS mounted on the vehicle, there are a forward collision avoidance (FCA) system, an autonomous emergency brake (AEB) system, and a driver attention warning (DAW) system. Such systems are collision avoidance and attention warning systems configured to determine a risk of collision with an object in a traveling situation of the vehicle, and perform emergency braking in a collision situation.

SUMMARY

Therefore, it is an aspect of the present disclosure to provide an apparatus including a plurality of radar modules.

In accordance with one aspect of the present disclosure, an apparatus includes a radar module configured to provide information on an object around a vehicle and a controller configured to control at least one of a driving system, a braking system, and a steering system of the vehicle on the basis of the information on the object. The radar module includes a first antenna module installed at a front side of the vehicle, having a forward sensing area of the vehicle, and configured to obtain first radar data and a processor configured to obtain information on the object around the vehicle on the basis of processing the first radar data. The first antenna module includes a first substrate facing a front-right direction of the vehicle and a second substrate facing a front-left direction of the vehicle.

The first substrate may include a first antenna array having a first beam pattern facing forward from the vehicle and a second antenna array having a second beam pattern facing the front-right direction of the vehicle. The second substrate may include a third antenna array having a third beam pattern facing forward from the vehicle and a fourth antenna array having a fourth beam pattern facing the front-left direction of the vehicle.

An arrival distance of the first beam pattern and an arrival distance of the third beam pattern may be greater than an arrival distance of the second beam pattern and an arrival distance of the fourth beam pattern, respectively. A central angle of the second beam pattern and a central angle of the fourth beam pattern may be greater than a central angle of the first beam pattern and a central angle of the third beam pattern, respectively.

At least a part of the second beam pattern may overlap the fourth beam pattern.

A viewing angle of the first antenna module may be greater than each of the central angle of the second beam pattern and the central angle of the fourth beam pattern and smaller than a sum of the central angle of the second beam pattern and the central angle of the fourth beam pattern.

The viewing angle of the first antenna module may be 180 degrees or more

The radar module may further include a second antenna module installed at a right rear side of the vehicle, having rearward and rightward sensing areas of the vehicle, and configured to obtain second radar data, a third antenna module installed at a left rear side of the vehicle, having rearward and leftward sensing areas of the vehicle, and configured to obtain third radar data, and another processor configured to obtain information on the object around the vehicle on the basis of processing at least one of the second radar data or the third radar data. The second antenna module may include a third substrate facing a rear-right direction of the vehicle and a fourth substrate facing rightward from the vehicle, and the third antenna module may include a fifth substrate facing a rear-left direction of the vehicle and a sixth substrate facing leftward from the vehicle.

The third substrate may include a fifth antenna array having a fifth beam pattern facing rearward from the vehicle and a sixth antenna array having a sixth beam pattern facing the rear-right direction of the vehicle. The fourth substrate may include a seventh antenna array having a seventh beam pattern facing rightward from the vehicle.

An arrival distance of the fifth beam pattern may be greater than each of an arrival distance of the sixth beam pattern and an arrival distance of the seventh beam pattern. Each of a central angle of the sixth beam pattern and a central angle of the seventh beam pattern may be greater than a central angle of the fifth beam pattern.

At least a part of the sixth beam pattern may overlap the seventh beam pattern.

A viewing angle of the second antenna module may be greater than each of the central angle of the sixth beam pattern and the central angle of the seventh beam pattern and smaller than a sum of the central angle of the sixth beam pattern and the central angle of the seventh beam pattern.

A viewing angle of the first antenna module may be 180 degrees or more.

In accordance with another aspect of the present disclosure, an apparatus includes a radar module configured to provide information on an object around a vehicle and a controller configured to control at least one of a driving system, a braking system, and a steering system of the vehicle on the basis of the information on the object. The radar module includes a first antenna module installed at a right rear side of the vehicle, having rearward and rightward sensing areas of the vehicle, and configured to obtain first radar data, a second antenna module installed at a left rear side of the vehicle, having rearward and leftward sensing areas of the vehicle, and configured to obtain second radar data, and a processor configured to obtain information on the object around the vehicle on the basis of processing at least one of the first radar data or the second radar data. The first antenna module includes a first substrate facing a rear-right direction of the vehicle and a second substrate facing rightward from the vehicle. The second antenna module includes a third substrate facing a rear-left direction of the vehicle and a fourth substrate facing leftward from the vehicle.

The first substrate may include a first antenna array having a first beam pattern facing rearward from the vehicle and a second antenna array having a second beam pattern facing the rear-right direction of the vehicle. The second substrate may include a third antenna array having a third beam pattern facing rightward from the vehicle. The third substrate may include a fourth antenna array having a fourth beam pattern facing rearward from the vehicle and a fifth antenna array having a fifth beam pattern facing the rear-left direction of the vehicle. The fourth substrate may include a sixth antenna array having a sixth beam pattern facing leftward from the vehicle.

An arrival distance of the first beam pattern may be greater than each of an arrival distance of the second beam pattern and an arrival distance of the third beam pattern. An arrival distance of the fourth beam pattern may be greater than each of an arrival distance of the fifth beam pattern and an arrival distance of the fifth beam pattern.

At least a part of the second beam pattern may overlap the third beam pattern. At least a part of the fifth beam pattern may overlap the sixth beam pattern.

A viewing angle of the first antenna module may be greater than each of a central angle of the second beam pattern and a central angle of the third beam pattern and smaller than a sum of the central angle of the second beam pattern and the central angle of the third beam pattern.

The radar module may further include a third antenna module installed at a front side of the vehicle, having a forward sensing area of the vehicle, and configured to obtain third radar data, and another processor configured to obtain information on the object around the vehicle on the basis of processing the third radar data. The third antenna module may include a fifth substrate facing a front-right direction of the vehicle and a sixth substrate facing a front-left direction of the vehicle.

The fifth substrate may include a seventh antenna array having a seventh beam pattern facing forward from the vehicle and an eighth antenna array having an eighth beam pattern facing the front-right direction of the vehicle. The sixth substrate may include a ninth antenna array having a ninth beam pattern facing forward from the vehicle and a tenth antenna array having a tenth beam pattern facing forward from the vehicle.

The apparatus may further include a fourth antenna module installed at a front right side of the vehicle, having a front-right sensing area of the vehicle, and configured to obtain fourth radar data and a fifth antenna module installed at a front left side of the vehicle, having a front-left sensing area of the vehicle, and configured to obtain fifth radar data.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
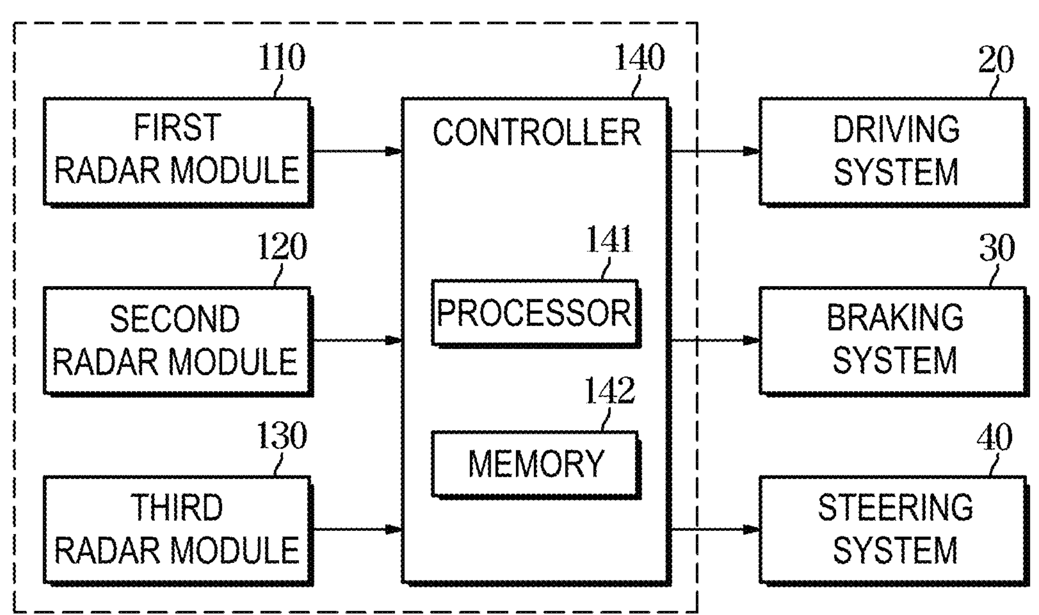
FIG. 1 is a view illustrating a configuration of a vehicle and a driver assist system according to one embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

Figure 2:
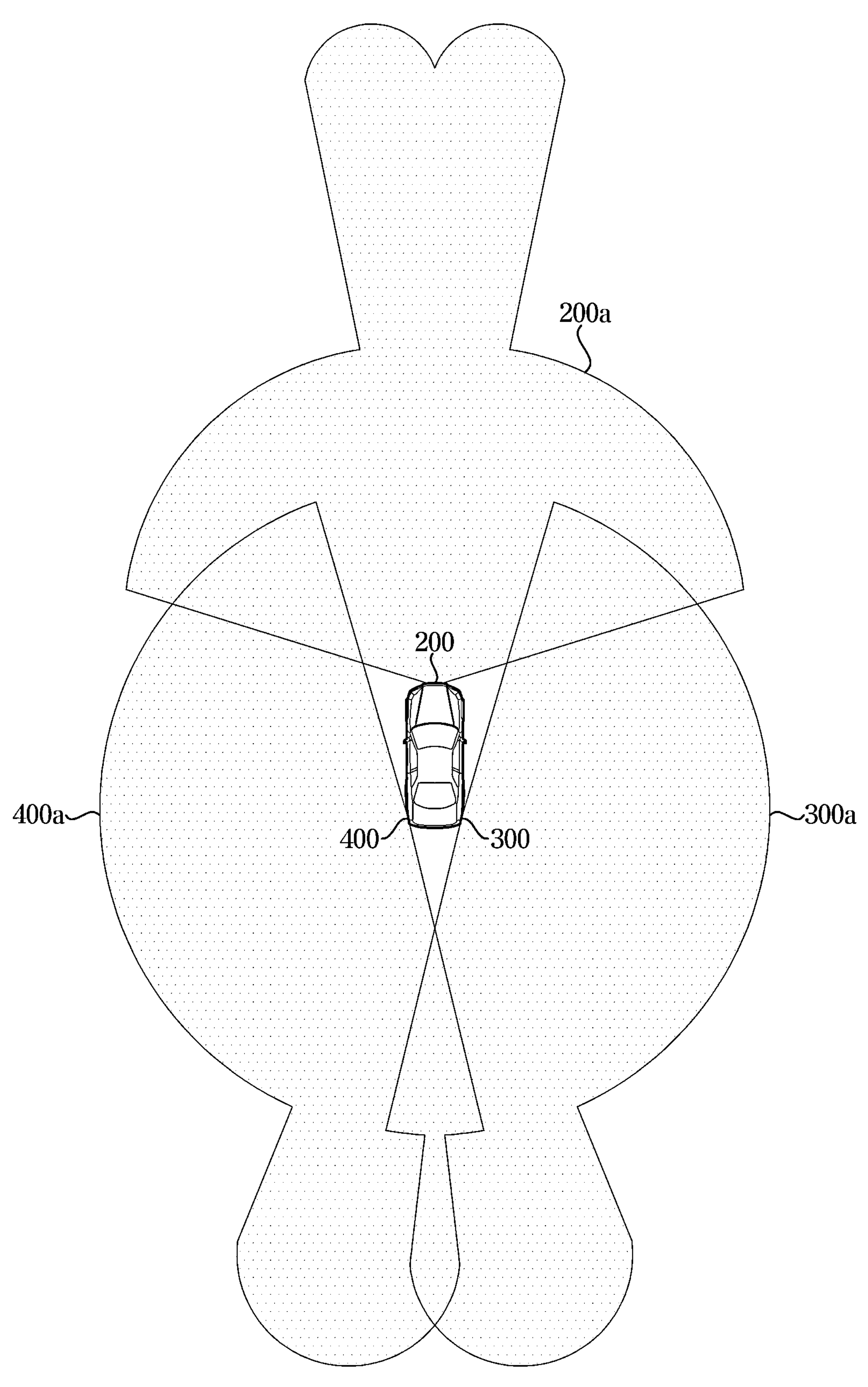
FIG. 2 is a view illustrating positions and sensing areas of radar modules included in the driver assist system according to one embodiment.

FIG. 1 is a view illustrating a configuration of a vehicle and a driver assist system according to one embodiment. FIG. 2 is a view illustrating positions and sensing areas of radar modules included in the driver assist system according to one embodiment.

As illustrated in FIGS. 1 and 2, a vehicle 1 includes a driving system 20, a braking system 30, a steering system 40, and a driver assist system 100. The driving system 20, the braking system 30, the steering system 40, and the driver assist system 100 may communicate with each other through a communication network (NT) for a vehicle. For example, the electrical systems 20, 30, 40, and 100 included in the vehicle 1 may exchange data through Ethernet, media oriented systems transport (MOST), FlexRay, controller area network (CAN), local interconnect network (LIN), and the like.

The driving system 20 moves the vehicle 1 and may include, for example, an engine, an engine management system (EMS), a transmission, and a transmission control unit (TCU).

The braking system 30 stops the vehicle 1 and may include, for example, a brake caliper and an electronic brake control module (EBCM). The EBCM may control the brake caliper in response to the driver's willingness to brake through a brake pedal and/or a request from the driver assist system 100.

The steering system 40 may change a traveling direction of the vehicle 1 and may include an electronic power steering (EPS) control module. The EPS control module may assist an operation of the steering system 40 in response to the driver's steering willingness through the steering wheel so that the driver may easily operate a steering wheel. In addition, the EPS control module may control the steering system in response to a request from the driver assist system 100.

The driver assist system 100 may provide various functions to the driver. For example, the driver assist system 100 may provide lane departure warning (LDW), lane keeping assist (LKA), high beam assist (HBA), autonomous emergency braking (AEB), traffic sign recognition (TSR), adaptive cruise control (ACC), and blind spot detection (BSD) functions, and the like.

The driver assist system 100 may include a first radar module 110, a second radar module 120, a third radar module 130, and a controller 140. The driver assist system 100 may not be limited to those illustrated in FIG. 1 and may further include a camera configured to capture an image around the vehicle 1 or a LiDAR configured scan around the vehicle 1 to detect an object.

As illustrated in FIG. 2, the first radar module 110 may be installed at a front side of the vehicle 1 and may include a first antenna module 200 having forward, front-right, and front-left sensing areas 200*a* of the vehicle 1. The first antenna module 200 may be installed, for example, on a grille or a bumper of the vehicle 1.

The first antenna module 200 may include a transmitting antenna (or a transmitting antenna array) configured to emit transmission radio waves in forward, front-right, and front-left directions of the vehicle 1 and a receiving antenna (or a receiving antenna array) configured to receive reflection radio waves reflected by an object. The first antenna module 200 may obtain detection data from the transmission radio waves transmitted by the transmitting antenna and the reflection radio waves received by the receiving antenna. The detection data may include distance information and speed information on another vehicle, a pedestrian, or a cyclist positioned at the front side from the vehicle 1.

The first radar module 110 may further include a digital signal processor (DSP) configured to selectively process detection data. The DSP may recognize an object on the basis of reflection radio waves and calculate a state distance to the object on the basis of a phase difference (or time difference) between transmission radio waves and the reflection radio waves and a relative speed of the object on the basis of a frequency difference between the transmission radio waves and the reflection radio waves.

The first radar module 110 may be connected to the controller 140, for example, through the communication NT for a vehicle, a hardwire, or a printed circuit board. The first radar module 110 may transmit detection data to the controller 140.

As illustrated in FIG. 2, the second radar module 120 may be installed at a right rear side of the vehicle 1 and may include a second antenna module 300 having rearward, right-rear, and rightward sensing areas 300*a* of the vehicle 1. In addition, as illustrated in FIG. 2, the third radar module 130 may be installed at a left rear side of the vehicle 1 and may include a third antenna module 400 having rearward, left-rear, and leftward sensing areas 400*a* of the vehicle 1.

Each of the second antenna module 300 and the third antenna module 400 may include a transmitting antenna (or transmitting antenna array) and a receiving antenna (or a receiving antenna array) and may obtain detection data from transmission radio waves transmitted by the transmitting antenna and reflection radio waves received by the receiving antenna.

Each of the second radar module 120 and the third radar module 130 may include a DSP configured to selectively process the detection data.

Each of the second radar module 120 and the third radar module 130 may be connected to the controller 140 through, for example, the communication NT for a vehicle, a hardwire, or a printed circuit board and may transmit the detection data to the controller 140.

The controller 140 may be electrically connected to the first radar module 110, the second radar module 120, and the third radar module 130. In addition, the controller 140 may be connected to the driving system 20, the braking system 30, and the steering system 40 through the communication NT for a vehicle.

The controller 140 includes a processor 141 and a memory 142.

The processor 141 may process detection data of the radar modules 110, 120, and 130 and generate driving signals, braking signals, and steering signals for controlling the driving system 20, the braking system 30, and the steering system 40. For example, the processor 141 may include a DSP configured to process the detection data of the radar modules 110, 120, and 130 and/or a micro control unit (MCU) configured to generate the driving signals, the braking signals, and the steering signals.

The memory 142 may store a program and/or data for the processor 141 to process the detection data and a program and/or data for the processor 141 to generate the driving signals, the braking signals, and/or the steering signals.

The memory 142 may temporarily store the detection data received from the radar modules 110, 120, and 130 and temporarily store a processing result of the detection data of the processor 141.

The memory 142 may include not only a volatile memory such as a static-random access memory (S-RAM) or a dynamic-random access memory (D-RAM) but also a non-volatile memory such as flash memory, a read only memory (ROM), or erasable programmable read only memory (EPROM).

Figure 3:
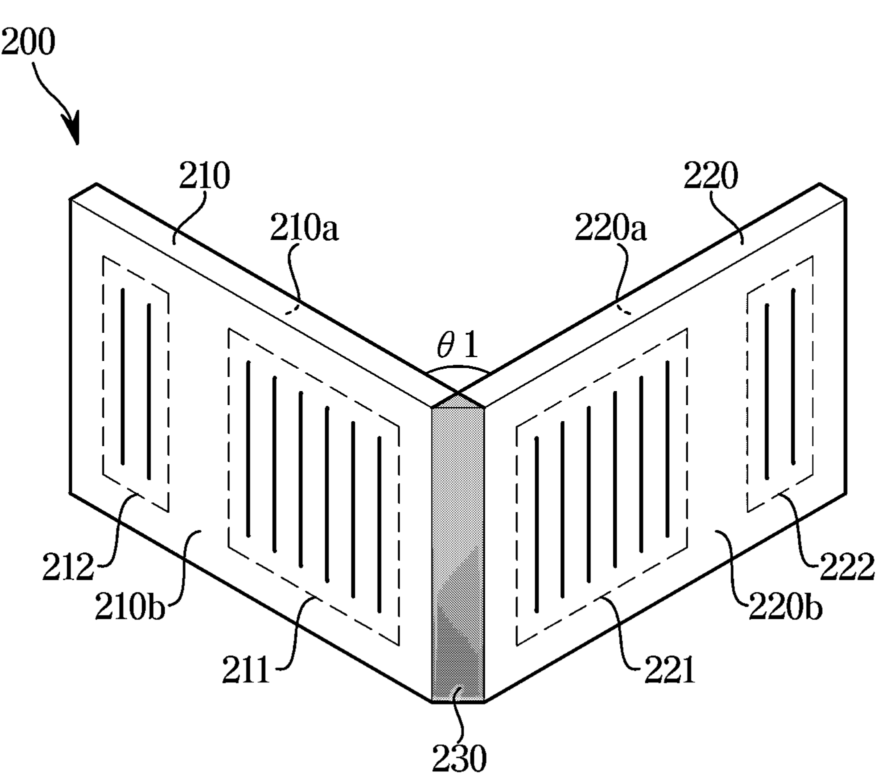
FIG. 3 is a view illustrating an example of a first radar module included in the driver assist system according to one embodiment.
Figure 4:
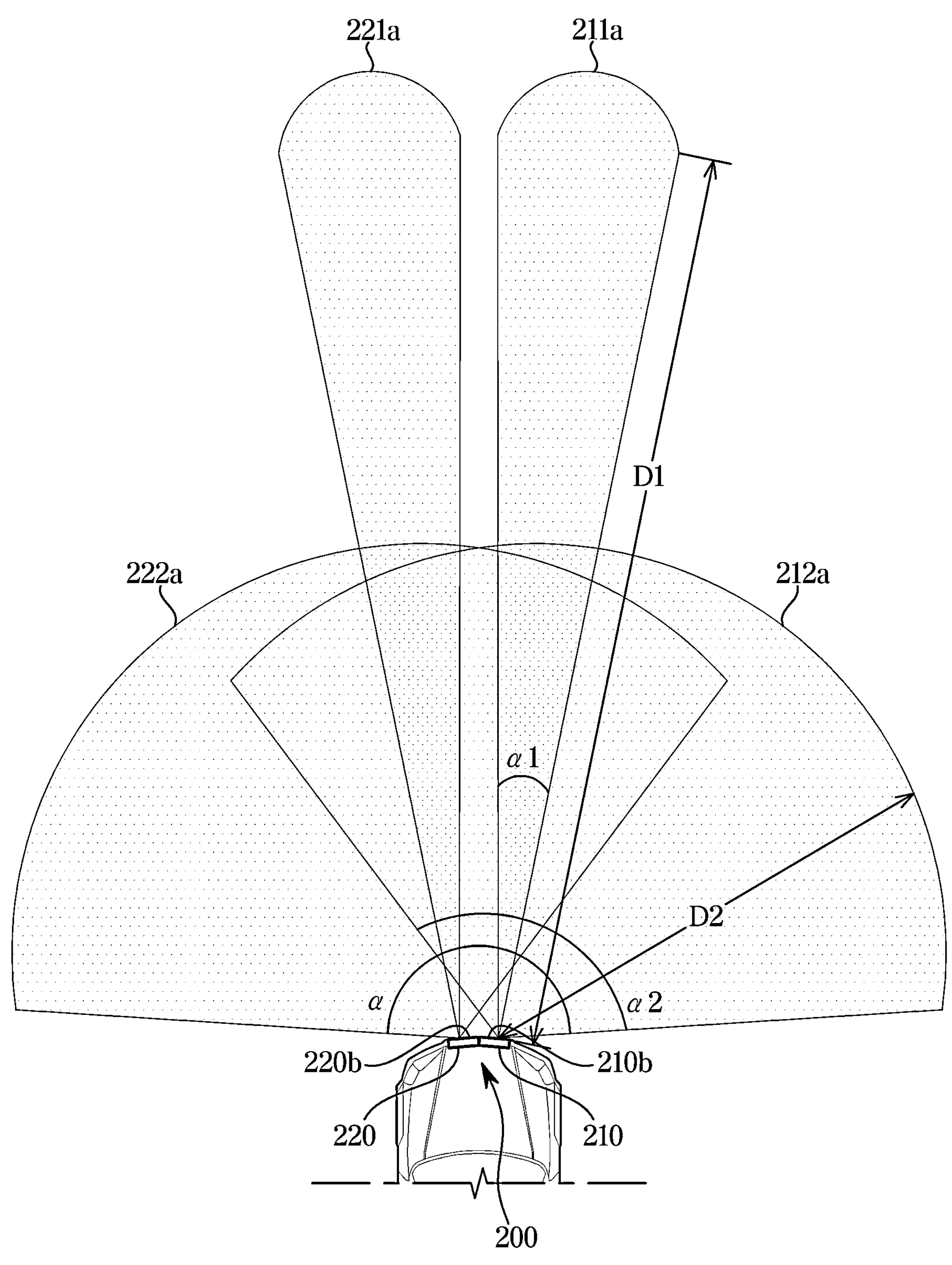
FIG. 4 is a view illustrating an example of beam patterns of the first radar module included in the driver assist system according to one embodiment.

FIG. 3 is a view illustrating an example of the first radar module included in the driver assist system according to one embodiment. FIG. 4 is a view illustrating an example of beam patterns of the first radar module included in the driver assist system according to one embodiment;

The first antenna module 200 may include a plurality of substrates 210 and 220 provided on different planes intersecting each other.

For example, as illustrated in FIGS. 3 and 4, the first antenna module 200 may include a first substrate 210 and a second substrate 220. The first substrate 210 may be provided on the different plane from the second substrate 220 and may intersect at a first line of intersection 230.

An angle θ1 between the first substrate 210 and the second substrate 220 around the first line of intersection 230 may be greater than 90 degrees and less than 180 degrees. For example, the angle θ1 between the first substrate 210 and the second substrate 220 around the first line of intersection 230 may be 120 degrees, 135 degrees, or the like without limitation.

The first substrate 210 and the second substrate 220 may include inner surfaces 210*a* and 220*a* and outer surfaces 210*b* and 220*b*, respectively. For example, the inner surface 210*a* of the first substrate 210 may face the second substrate 220, and the inner surface 220*a* of the second substrate 220 may face the first substrate 210. In addition, the outer surface 210*b* of the first substrate 210 may face a direction away from the second substrate 220, and the outer surface 220*b* of the second substrate 220 may face a direction away from the first substrate 210.

As illustrated in FIG. 4, the first antenna module 200 may be installed on the vehicle 1 so that the outer surface 210*b* of the first substrate 210 and the outer surface 220*b* of the second substrate 220 face forward from the vehicle 1. For example, the outer surface of the first substrate 210 may face a left-front direction of the vehicle 1, and the outer surface of the second substrate 220 may face a right-front direction of the vehicle 1. In addition, the first antenna module 200 may be installed on the vehicle 1 so that a center line of the first antenna module 200 crossing the first line of intersection 230 of the first substrate 210 and the second substrate 220 is parallel to a center line of the vehicle 1.

As described above, the outer surfaces 210*b* and 220*b* of the first substrate 210 and the second substrate 220 may face forward from the vehicle 1, and the first antenna module 200 may emit radio waves forward from the vehicle 1 and also receive radio waves propagated forward from the vehicle 1.

Each of the outer surface 210*b* of the first substrate 210 and the outer surface 220*b* of the second substrate 220 may be provided with at least one antenna capable of transmitting, receiving, or transmitting and receiving radio waves.

The first substrate 210 may include a first antenna array 211 and a second antenna array 212. The first antenna array 211 and the second antenna array 212 may be provided on an outer surface of the first substrate 210.

Each of the first antenna array 211 and the second antenna array 212 may include a plurality of antennas. Types of the plurality of antennas may vary. For example, as illustrated in FIG. 3, each of the plurality of antennas may be a microstrip antenna. However, each type of the plurality of antennas is not limited to that as illustrated in FIG. 3. For example, each of the plurality of antennas may be a slot antenna or a patch antenna.

The number of the plurality of antennas constituting the first antenna array 211 may be different from the number of the plurality of antennas constituting the second antenna array 212. For example, the number of the plurality of antennas constituting the first antenna array 211 may be greater than the number of the plurality of antennas constituting the second antenna array 212.

The first antenna array 211 may emit radio waves having a first beam pattern 211*a*. In this case, a beam pattern may indicate an intensity of radio waves emitted from an antenna toward a three-dimensional space or a two-dimensional plane. For example, a beam pattern may be a curve connecting half power points (3 dB points) at which radio waves having half intensities.

The first beam pattern 211*a* may have substantially a fan shape expanding forward from the vehicle 1 as illustrated in FIG. 4.

The second antenna array 212 may emit radio waves having a second beam pattern 212*a*. The second beam pattern 212*a* may have approximately a fan shape expanding in the front-right direction of the vehicle 1.

An arrival distance D1 of the first beam pattern 211*a* is greater than an arrival distance D2 of the second beam pattern 212*a*. In other words, the radio waves emitted by the first antenna array 211 may propagate farther than the radio waves emitted from the second antenna array 212. In addition, a reception distance of the first antenna array 211 may be greater than a reception distance of the second antenna array 212.

A central angle α2 of the second beam pattern 212*a* is greater than a central angle α1 of the first beam pattern 211*a*. In other words, the radio waves emitted by the second antenna array 212 may propagate in a wider angular range than the radio waves emitted by the first antenna array 211. In addition, a reception angle range of the second antenna array 212 is greater than a reception angle range of the first antenna array 211.

As described above, the first beam pattern 211*a* of the first antenna array 211 may be narrower and longer than the second beam pattern 212*a* of the second antenna array 212. In other words, the first antenna array 211 may be a far field antenna and the second antenna array 212 may be a near field antenna.

The second substrate 220 may include a third antenna array 221 and a fourth antenna array 222. The third antenna array 221 and the fourth antenna array 222 may be provided on the outer surface of the second substrate 220.

Each of the third antenna array 221 and the fourth antenna array 222 may include a plurality of antennas. For example, the number of the plurality of antennas constituting the third antenna array 221 may be greater than the number of the plurality of antennas constituting the fourth antenna array 222. For example, the number of antennas constituting the third antenna array 221 is equal to the number of the plurality of antennas constituting the first antenna array 211, and the number of the plurality of antennas constituting the fourth antenna array 222 may be equal to the number of antennas constituting the second antenna array 212.

The third antenna array 221 may emit radio waves having a third beam pattern 221*a* formed in a fan shape. In addition, the fourth antenna array 222 may emit radio waves having a fourth beam pattern 222*a* formed in a fan shape.

As illustrated in FIG. 4, the third beam pattern 221*a* may have approximately the fan shape expanding forward from the vehicle 1. The fourth beam pattern 222*a* may have approximately the fan shape expanding in the front-left direction of the vehicle 1.

An arrival distance D3 of the third beam pattern 221*a* is greater than an arrival distance D4 of the fourth beam pattern 222*a*. In addition, a central angle α4 of the fourth beam pattern 222*a* is greater than a central angle α3 of the third beam pattern 221*a*.

As described above, the third beam pattern 221*a* of the third antenna array 221 may be narrower and longer than the fourth beam pattern 222*a* of the fourth antenna array 222.

The first beam pattern 211*a* of the first antenna array 211 and the third beam pattern 221*a* of the third antenna array 221 may form a far field beam pattern of the first antenna module 200 together.

In addition, the second beam pattern 212*a* of the second antenna array 212 and the fourth beam pattern 222*a* of the fourth antenna array 222 may form a near field beam pattern of the first antenna module 200 together. In this case, the second beam pattern 212*a* of the second antenna array 212 may at least partially overlap the fourth beam pattern 222*a* of the fourth antenna array 222.

Theoretically, a viewing angle (central angle of a beam pattern) of a near field antenna may be at 180 degrees, but it is generally known that the viewing angle of the near field antenna of more than 170 degrees is difficult to achieve.

Since the second beam pattern 212*a* of the second antenna array 212 and the fourth beam pattern 222*a* of the fourth antenna array 222 form the near beam pattern of the first antenna module 200 together, and the second beam pattern 212*a* of the second antenna array 212 at least partially overlaps the fourth beam pattern 222*a* of the fourth antenna array 222, a near field viewing angle α of the first antenna module 200 may be greater than each of the central angle α2 of the second beam pattern 212*a* and the central angles α4 of the fourth beam pattern 222*a*.

As described above, the near field viewing angle α of the first antenna module 200 may be greater than each of the central angles α2 and α4 of the individual beam patterns 212*a* and 222*a* of the near field antennas 212 and 222. In other words, the sensing area of the first antenna module 200 is greater than a sensing area of each of the individual near field antennas 212, 222.

Accordingly, the first antenna module 200 installed at the front side of the vehicle 1 not only may detect an object positioned at the front side from the vehicle 1 but may also detect an object at the left front side and the right front side of the vehicle 1. Accordingly, the first antenna module 200 may cover for corner antennas which may be provided at a left front side and a right front side of the vehicle 1.

Figure 5:
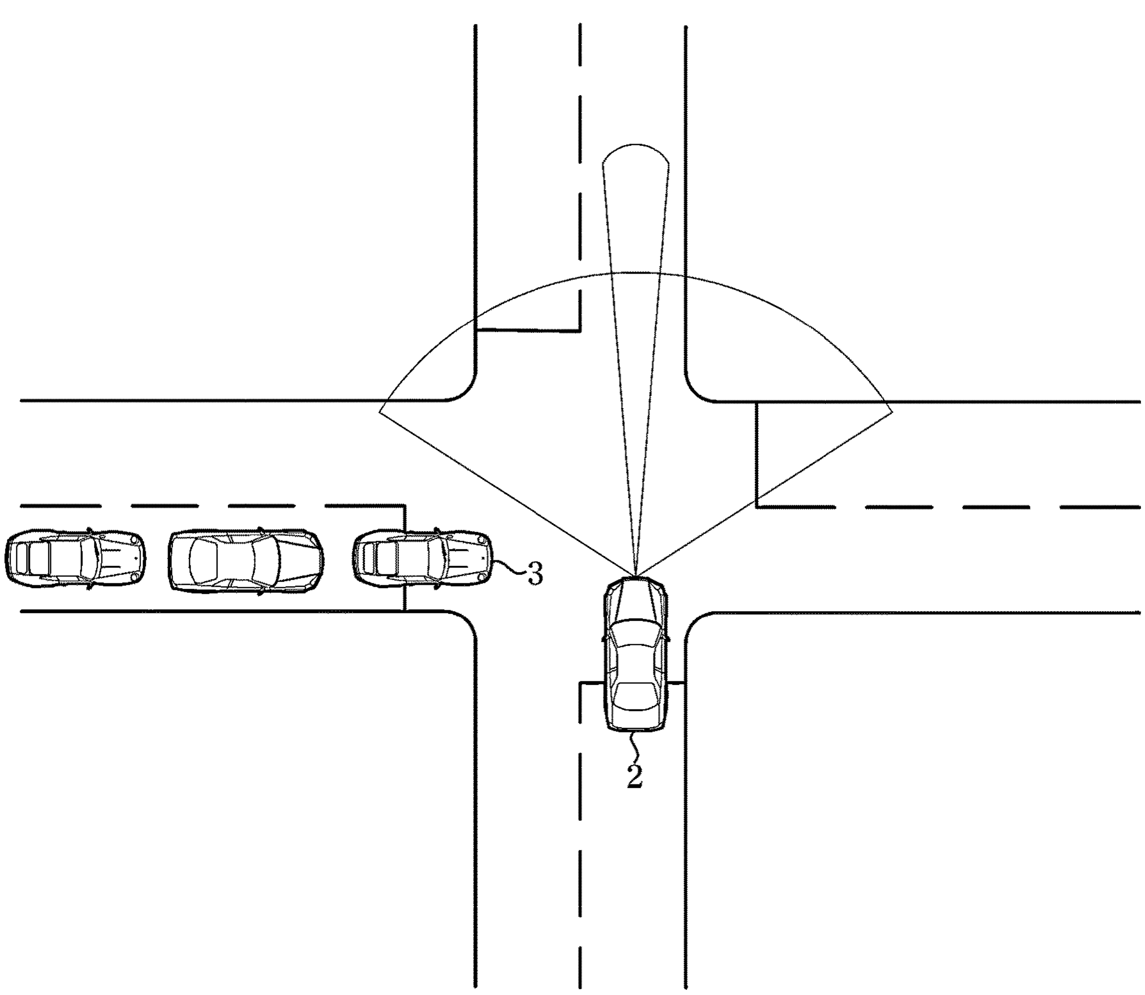
FIG. 5 is a view illustrating a sensing area of a radar according to a conventional technology when a vehicle enters an intersection.
Figure 6:
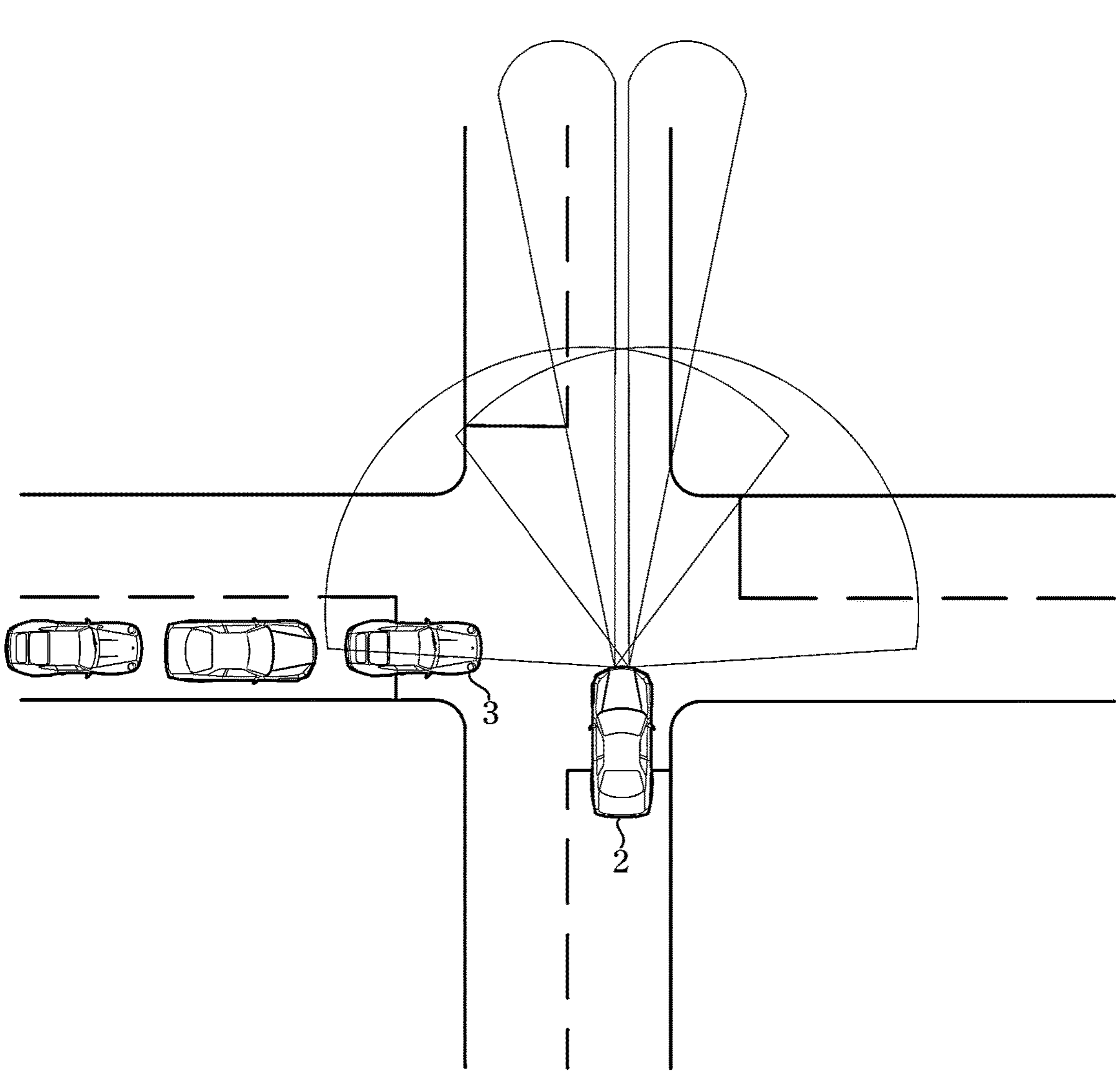
FIG. 6 is a view illustrating a sensing area of the radar module when the vehicle enters an intersection according to one embodiment.

FIG. 5 is a view illustrating a sensing area of a radar module according to the conventional technology when a vehicle enters an intersection. FIG. 6 is a view illustrating a sensing area of the radar module when the vehicle enters an intersection according to one embodiment.

As illustrated in FIG. 5, a vehicle 2 including a front antenna according to the conventional technology may enter an intersection. In this case, another vehicle 3 may violate a traffic signal and enter the intersection to a left side of the vehicle 2.

The other vehicle 3 which violates the traffic signal is out of a forward sensing area of the vehicle 2 which has entered the intersection. Since an angle of a sensing area of the front antenna according to the conventional technology is small, the vehicle 2 entering the intersection may not detect the other vehicle 3 traveling toward the vehicle 2 at a side of the vehicle 2.

Accordingly, the vehicle 2 including the front antenna according to the conventional technology may not avoid the other vehicle 3 and may collide with the other vehicle 3.

In addition, as illustrated in FIG. 6, the vehicle 1 including the first antenna module 200 according to one embodiment may enter the intersection. In this case, another vehicle 3 may violate a traffic signal and enter the intersection to the left side of the vehicle 1.

The other vehicle 3 which violates the traffic signal is not out of the sensing area of the first antenna module 200 installed on the vehicle 1 entering the intersection. In other words, the near field viewing angle α of the first antenna module 200 is greater than a viewing angle of the beam pattern of the individual near field antenna, and the near field viewing angle α of the first antenna module 200 may be approximately 180 degrees or more.

As described above, even after the vehicle 1 has entered the intersection, the first antenna module 200 may detect the other vehicle 3 entering the intersection and traveling toward a side surface of the vehicle 1.

Accordingly, the vehicle 1 including the first antenna module 200 according to one embodiment can avoid collision with the other vehicle 3.

As described above, the first antenna module 200 may include the first substrate 210 and the second substrate 220 which intersect with each other. The first substrate 210 may face the left front side from the vehicle 1, and the second substrate 220 may face the right front side from the vehicle 1.

The first substrate 210 and the second substrate 220 may be provided with the far field antenna arrays (first antennas and third antennas) and the near field antenna arrays (second antennas and fourth antennas), respectively. Overlapping beam patterns of the near field antenna arrays may form a beam pattern having a viewing angle of about 180 degrees or more. In other words, the viewing angle of the first antenna module 200 may be about 180 degrees or more.

Accordingly, the sensing area of the first antenna module 200 may include the front side (the left front side and the right front side) from the vehicle 1. In addition, the first antenna module 200 may cover for corner antennas which may be installed at the left front side and the right front side of the vehicle 1.

Figure 7:
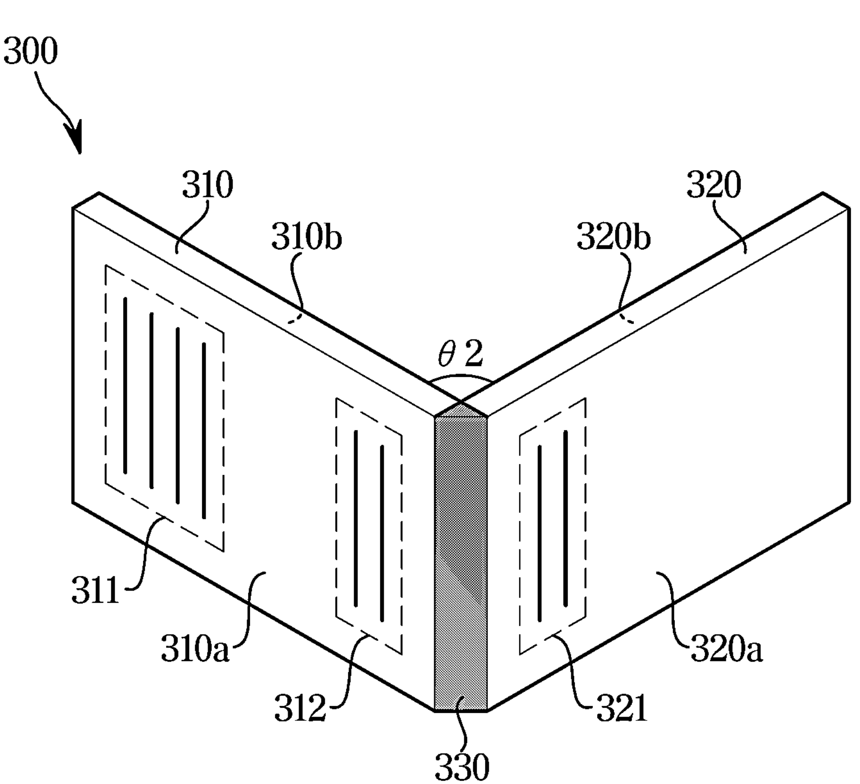
FIG. 7 is a view illustrating an example of a second radar module included in the driver assist system according to one embodiment.
Figure 8:
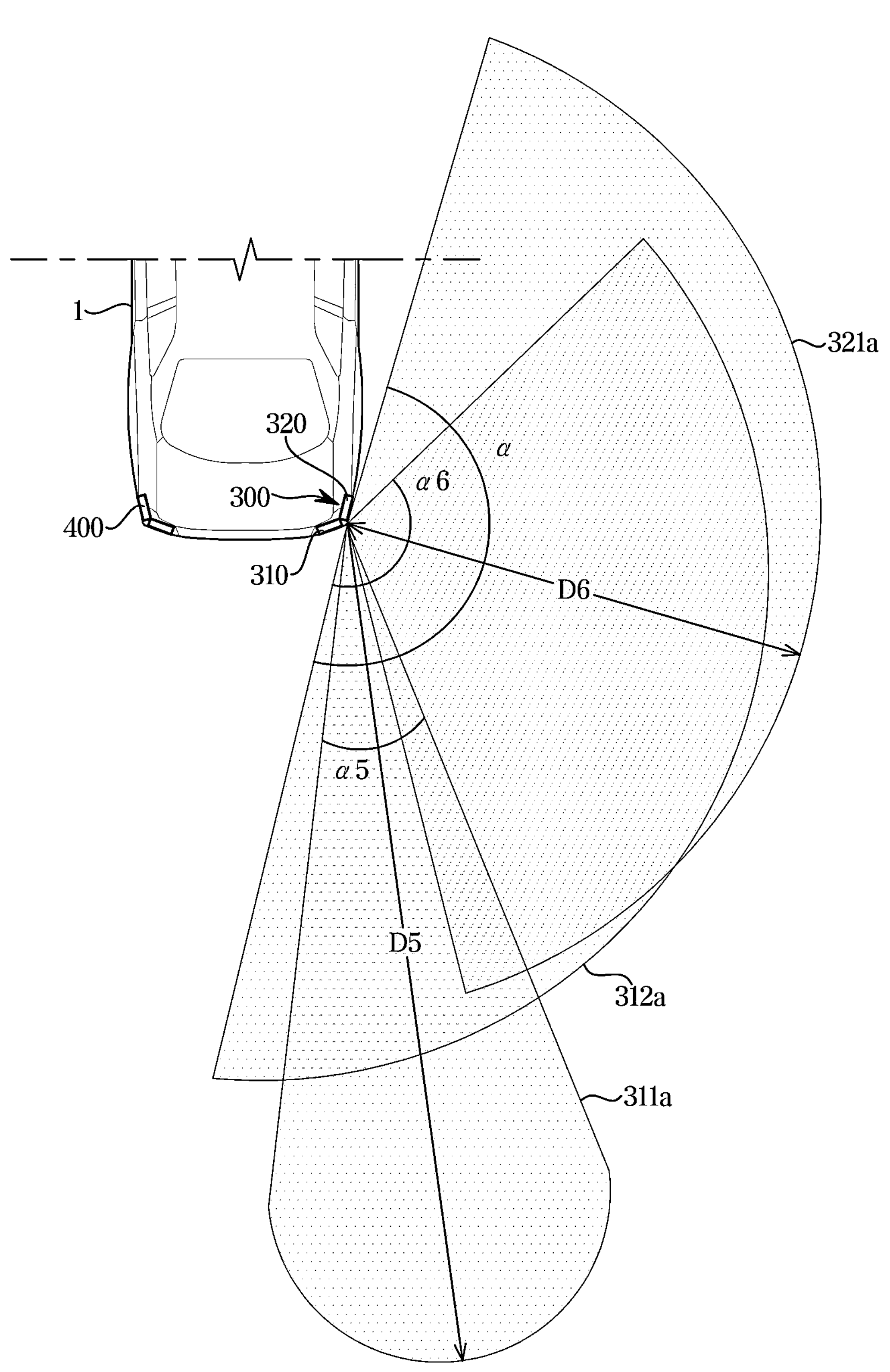
FIG. 8 is a view illustrating an example of beam patterns of the second radar module included in the driver assist system according to one embodiment.

FIG. 7 is a view illustrating an example of the second radar module included in the driver assist system according to one embodiment. FIG. 8 is a view illustrating an example of beam patterns of the second radar module included in the driver assist system according to one embodiment;

The second antenna module 300 may include a plurality of substrates 310 and 320 provided on different planes intersecting each other.

For example, as illustrated in FIGS. 7 and 8, the second antenna module 300 may include a third substrate 310 and a fourth substrate 320. The third substrate 310 may be provided on the different planes from the fourth substrate 320 and may intersect at a second line of intersection 330.

An angle θ1 between the third substrate 310 and the fourth substrate 320 around the second line of intersection 330 may be greater than 90 degrees and less than 180 degrees. For example, the angle θ1 between the third substrate 310 and the fourth substrate 320 around the second line of intersection 330 may be 120 degrees, 135 degrees, or the like without limitation.

The third substrate 310 and the fourth substrate 320 may include inner surfaces 310*a* and 320*a* and outer surfaces 310*b* and 320*b*, respectively. For example, the inner surface 310*a* of the third substrate 310 may face the fourth substrate 320, and the inner surface 320*a* of the fourth substrate 320 may face the third substrate 310. In addition, the outer surface 310*b* of the third substrate 310 may face a direction away from the fourth substrate 320, and the outer surface 320*b* of the fourth substrate 320 may face a direction away from the third substrate 310.

As illustrated in FIG. 8, the second antenna module 300 may be installed on the vehicle 1 so that the outer surface 310*b* of the third substrate 310 faces the right-rear direction of the vehicle 1, and the outer surface 320*b* of the fourth substrate 320 faces rightward from the vehicle 1.

As described above, the outer surfaces 310*b* and 320*b* of the third substrate 310 and the fourth substrate 320 are face the right-rear and rightward directions of the vehicle 1, respectively, and the second antenna module 300 may emit radio waves in the right-rear and rightward directions of the vehicle 1 and may also receive radio waves propagated in the right-rear and rightward directions of the vehicle 1.

Each of the outer surface 310*b* of the third substrate 310 and the outer surface 320*b* of the fourth substrate 320 may be provided with at least one antenna capable of transmitting, receiving, or transmitting and receiving radio waves.

The third substrate 310 may include a fifth antenna array 311 and a sixth antenna array 312. The fifth antenna array 311 and the sixth antenna array 312 may be provided on the outer surface of the third substrate 310.

Each of the fifth antenna array 311 and the sixth antenna array 312 may include a plurality of antennas. Types of the plurality of antennas may vary. For example, as illustrated in FIG. 7, each of the plurality of antennas may be a microstrip antenna. However, each type of the plurality of antennas is not limited to that illustrated in FIG. 7. For example, each of the plurality of antennas may be a slot antenna or a patch antenna.

The number of the antennas constituting the fifth antenna array 311 may be different from the number of the plurality of antennas constituting the sixth antenna array 312. For example, the number of the plurality of antennas constituting the fifth antenna array 311 may be greater than the number of the plurality of antennas constituting the sixth antenna array 312.

The fifth antenna array 311 may emit radio waves having a fifth beam pattern 311*a*. As illustrated in FIG. 8, the fifth beam pattern 311*a* may have substantially a fan shape expanding rearward from the vehicle 1.

The sixth antenna array 312 may emit radio waves having a sixth beam pattern 312*a*. The sixth beam pattern 312*a* may have substantially a fan shape expanding in the right-rear direction of the vehicle 1.

An arrival distance D5 of the fifth beam pattern 311*a* is greater than an arrival distance D6 of the sixth beam pattern 312*a*. In addition, a central angle α6 of the sixth beam pattern 312*a* is greater than a central angle α5 of the fifth beam pattern 311*a*.

As described above, the fifth beam pattern 311*a* of the fifth antenna array 311 may be narrower and longer than the sixth beam pattern 312*a* of the sixth antenna array 312. In other words, the fifth antenna array 311 may be a far field antenna, and the sixth antenna array 312 may be a near field antenna.

The fourth substrate 320 may include a seventh antenna array 321. The seventh antenna array 321 may be provided on the outer surface of the fourth substrate 320.

The seventh antenna array 321 may include a plurality of antennas. The number of the plurality of antennas constituting the seventh antenna array 321 may be equal to the number of the plurality of antennas constituting the sixth antenna array 312.

The seventh antenna array 321 may emit radio waves having a seventh beam pattern 321*a* formed in a fan shape. The seventh beam pattern 321*a* of the seventh antenna array 321 may be approximately the same as the sixth beam pattern 312*a* of the sixth antenna array 312.

As described above, the fifth beam pattern 311*a* of the fifth antenna array 311 may form a far field beam pattern of the second antenna module 300.

In addition, the sixth beam pattern 312*a* of the sixth antenna array 312 and the seventh beam pattern 321*a* of the seventh antenna array 321 may form a near field beam pattern of the second antenna module 300 together. In this case, the sixth beam pattern 312*a* of the sixth antenna array 312 may at least partially overlap the seventh beam pattern 321*a* of the seventh antenna array 321.

Since the sixth beam pattern 312*a* of the sixth antenna array 312 and the seventh beam pattern 321*a* of the seventh antenna array 321 form the near field beam pattern of the second antenna module 300 together, and the sixth beam pattern 312*a* of the sixth antenna array 312 at least partially overlaps the seventh beam pattern 321*a* of the seventh antenna array 321, a near field viewing angle α of the second antenna module 300 may be greater than each of the central angle α6 of the sixth beam pattern 312*a* and a central angle α7 of the seventh beam pattern 321*a*.

As described above, the near field viewing angle α of the second antenna module 300 may be greater than each of the central angles α6 and α7 of the beam patterns 312*a* and 321*a* of the individual near field antennas 312 and 321. In other words, the sensing area of the second antenna module 300 becomes greater than a sensing area of each of the individual near field antennas 312 and 321.

Accordingly, the second antenna module 300 installed at the right rear side of the vehicle 1 not only may detect an object positioned at the right rear side from the vehicle 1 but may also detect an object at the rear side of the vehicle 1 and the right side of the vehicle 1. Accordingly, the second antenna module 300 may cover for a rear antenna which may be provided at a rear side of the vehicle 1.

The third antenna module 400 has the same structure and the same function as the second antenna module 300, and a description of the third antenna module 400 is replaced by the description of the second antenna module 300.

The third antenna module 400 installed at the left rear side of the vehicle 1 not only may detect an object positioned at the left rear side of the vehicle 1 but also may detect an object positioned at the rear side of the vehicle 1 and the left side of the vehicle 1. Accordingly, the third antenna module 400 may cover for a rear antenna which may be provided at the rear side of the vehicle 1.

Figure 9:
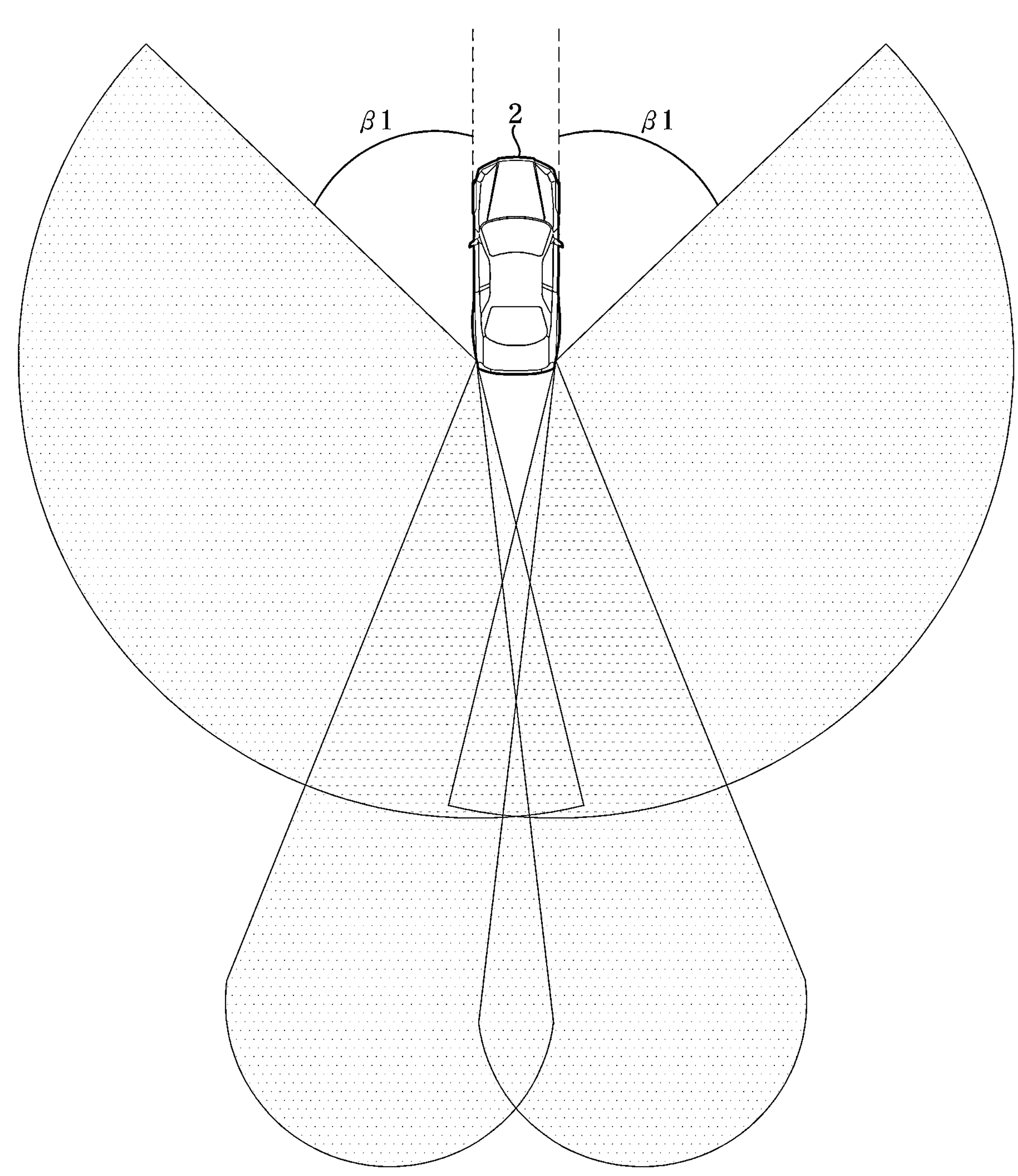
FIG. 9 is a view illustrating sensing areas of corner radars according to the conventional technology.
Figure 10:
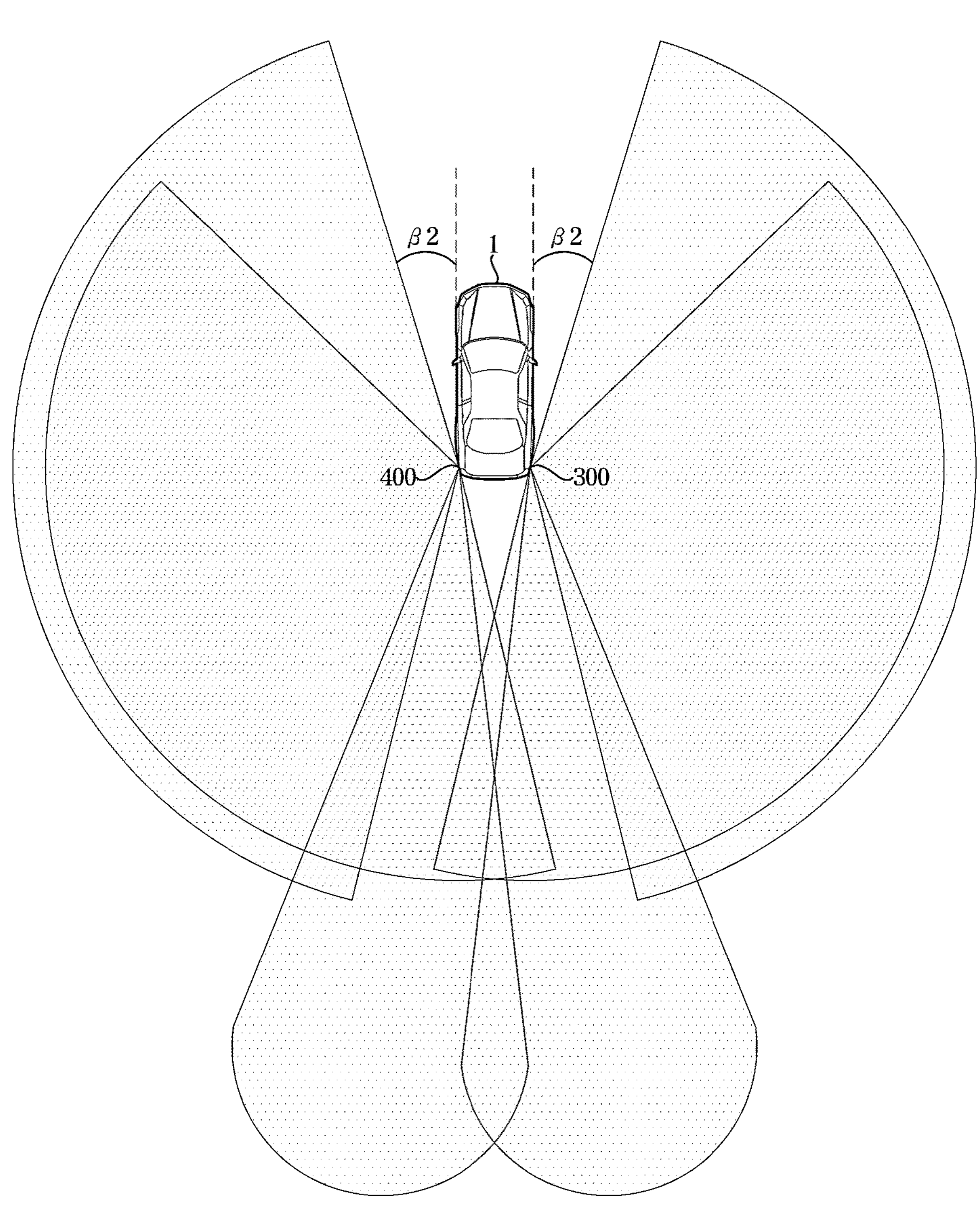
FIG. 10 is a view illustrating sensing areas of the second radar module and a third radar module included in the driver assist system according to one embodiment.

FIG. 9 is a view illustrating sensing areas of corner radars according to the conventional technology. FIG. 10 is a view illustrating sensing areas of the second radar module and the third radar module included in the driver assist system according to one embodiment; and As illustrated in FIGS. 9 and 10, each of the corner radars according to the conventional technology has a sensing area in the right-rear and left-rear directions of the vehicle 2. However, each of the corner radars according to the conventional technology does not have a rightward or leftward sensing area of the vehicle 2.

However, the second antenna module 300 and the third antenna module 400 not only have the sensing areas in the right-rear and left-rear directions of the vehicle 1 but have also the rightward and leftward sensing areas of the vehicle 1.

Accordingly, a shading angle (31 of each of the corner radars according to the conventional technology is greater than a shading angle (32 of each of the second antenna module 300 and the third antenna module 400. In other words, the corner radars according to the conventional technology do not detect close objects at the left side and the right side of the vehicle 2. On the other hand, the second antenna module 300 and the third antenna module 400 may detect close objects at the left side and the right side of the vehicle 1.

As described above, the second antenna module 300 may include the third substrate 310 and the fourth substrate 320 which intersect with each other. The third substrate 310 may face the right-rear direction of the vehicle 1, and the fourth substrate 320 may face rightward from the vehicle 1.

The third substrate 310 may be provided with a far field antenna array (fifth antennas), and the third substrate 310 and the fourth substrate 320 may be provided with near field antenna arrays (sixth antennas and seventh antennas), respectively. The overlapping beam patterns of the near field antenna arrays may form a beam pattern having a viewing angle of about 180 degrees or more. In other words, the viewing angle of the second antenna module 300 may be about 180 degrees or more.

Accordingly, the sensing area of the second antenna module 300 may include a sensing range in rearward, right-rear, and rightward directions of the vehicle 1.

In addition, a structure of the third antenna module 400 may be substantially the same as the second antenna module 300. The sensing area of the third antenna module 400 may include a sensing range in rearward, right-rear, and rightward directions of the vehicle 1.

The second antenna module 300 and the third antenna module 400 may cover for rear antennas which may be installed at the rear side of the vehicle 1.

Figure 11:
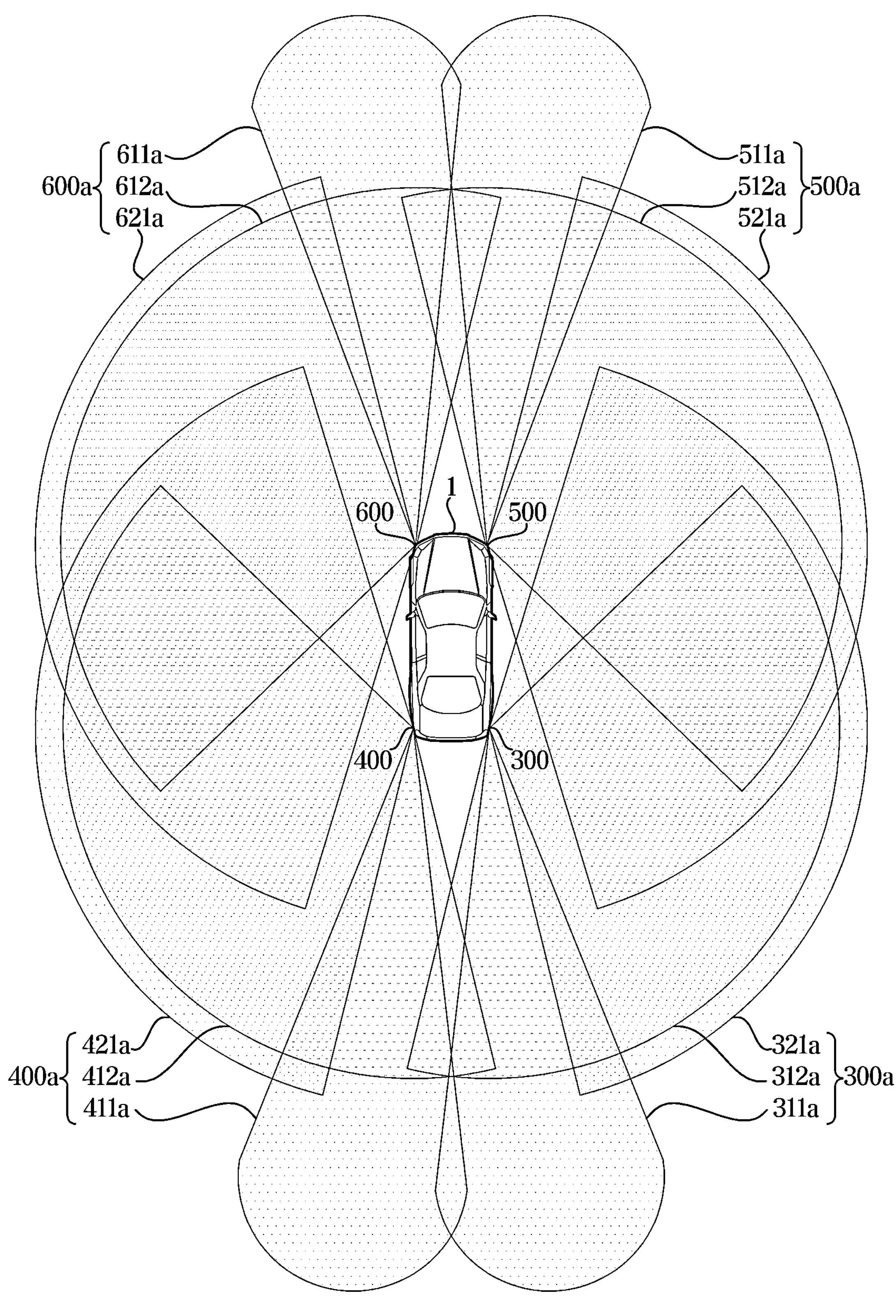
FIG. 11 is a view illustrating positions and the sensing areas of the radar modules included in the driver assist system according to one embodiment.

FIG. 11 is a view illustrating positions and the sensing areas of the radar modules included in the driver assist system according to one embodiment.

The driver assist system 100 may include the second antenna module 300, the third antenna module 400, a fourth antenna module 500, and a fifth antenna module 600.

As illustrated in FIG. 11, the second antenna module 300 may be installed at the right rear side of the vehicle 1 and may have the sensing area 300*a* in rearward, right-rear, and rightward directions of the vehicle 1.

The second antenna module 300 may include the third substrate in the right-rear direction and the fourth substrate facing rightward.

The third substrate may include the fifth antenna array having the fifth beam pattern 311*a* facing rearward and the sixth antenna array having the sixth beam pattern 312*a* facing the right-rear direction. The fourth substrate may include the seventh antenna array having the seventh beam pattern 321*a* facing rightward. The fifth antenna array may be the far field antenna, and the sixth antenna array and the seventh antenna array may be near field antennas.

As illustrated in FIG. 11, the third antenna module 400 may be installed at the left rear side of the vehicle 1 and may have the rearward, left-rear, leftward sensing areas 400*a* of the vehicle 1.

The third antenna module 400 may include a fifth substrate facing the left-rear direction and a sixth substrate facing leftward.

The fifth substrate may include an eighth antenna array having an eighth beam pattern 411*a* facing rearward and a ninth antenna array having a ninth beam pattern 412*a* facing the left-rear direction. The sixth substrate may include a tenth antenna array having a tenth beam pattern 421*a* facing rightward. The eighth antenna array may be a far field antenna, and the ninth antenna array and the tenth antenna array may near field antennas.

As illustrated in FIG. 11, the fourth antenna module 500 may be installed at the right front side of the vehicle 1 and may have a sensing area 500*a* facing forward, right-front, and rightward directions of the vehicle 1.

The fourth antenna module 500 may include a seventh substrate facing the right-front direction and an eighth substrate facing rightward.

The seventh substrate may include an eleventh antenna array having an eleventh beam pattern 511*a* facing rearward and a twelfth antenna array having a twelfth beam pattern 512*a* facing the left-rear direction. The eighth substrate may include a thirteenth antenna array having a thirteenth beam pattern 521*a* facing rightward. The eleventh antenna array may be a far field antenna, and the twelfth antenna array and the thirteenth antenna array may be near field antennas.

As illustrated in FIG. 11, the fifth antenna module 600 may be installed at the left front side of the vehicle 1 and may have forward, left-front, leftward sensing areas 600*a* of the vehicle 1.

The fifth antenna module 600 may include a ninth substrate facing the left-front direction and a tenth substrate facing leftward.

The ninth substrate may include a fourteenth antenna array having a fourteenth beam pattern 611*a* facing rearward and a fifteenth antenna array having a fifteenth beam pattern 612*a* facing the left-rear direction. The tenth substrate may include a sixteenth antenna array having a sixteenth beam pattern 621*a* facing rightward. The fourteenth antenna array may be a far field antenna, and the fifteenth antenna array and the sixteenth antenna array may be near field antennas.

According to one aspect of the disclosed invention, an apparatus including a plurality of radar modules may be provided. Accordingly, the number of radar modules can be minimized.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus comprising:

a radar configured to provide information on an object around a vehicle; and a controller configured to control at least one of a driving system, a braking system, and a steering system of the vehicle on the basis of the information on the object, wherein the radar comprises:

a first antenna installed at a front side of the vehicle, having a forward sensing area of the vehicle, and configured to obtain first radar data, and a processor configured to obtain information on the object around the vehicle on the basis of processing the first radar data, wherein the first antenna comprises a first substrate facing a front-right direction of the vehicle and a second substrate facing a front-left direction of the vehicle, wherein the first substrate comprises:

a second antenna array having a second beam pattern facing the front-right direction of the vehicle, wherein the second substrate comprises:

a fourth antenna array having a fourth beam pattern facing the front-left direction of the vehicle, wherein at least a part of the second beam pattern overlaps the fourth beam pattern, wherein the first substrate comprises a first antenna array having a first beam pattern facing forward from the vehicle, and the second substrate comprises a third antenna array having a third beam pattern facing forward from the vehicle, wherein an arrival distance of the first beam pattern and an arrival distance of the third beam pattern are greater than an arrival distance of the second beam pattern and an arrival distance of the fourth beam pattern, respectively, and a central angle of the second beam pattern and a central angle of the fourth beam pattern are greater than a central angle of the first beam pattern and a central angle of the third beam pattern, respectively.

2. The apparatus of claim 1, wherein a viewing angle of the first antenna is greater than each of the central angle of the second beam pattern and the central angle of the fourth beam pattern and smaller than a sum of the central angle of the second beam pattern and the central angle of the fourth beam pattern.

3. The apparatus of claim 1, wherein the viewing angle of the first antenna is 180 degrees or more.

4. The apparatus of claim 1, wherein the radar further comprises:

a second antenna installed at a right rear side of the vehicle, having rearward and rightward sensing areas of the vehicle, and configured to obtain second radar data;

a third antenna installed at a left rear side of the vehicle, having rearward and leftward sensing areas of the vehicle, and configured to obtain third radar data; and another processor configured to obtain information on the object around the vehicle on the basis of processing at least one of the second radar data or the third radar data, wherein the second antenna comprises a third substrate facing a rear-right direction of the vehicle and a fourth substrate facing rightward from the vehicle, and the third antenna comprises a fifth substrate facing a rear-left direction of the vehicle and a sixth substrate facing rearward from the vehicle.

5. The apparatus of claim 4, wherein:

the third substrate comprises a fifth antenna array having a fifth beam pattern facing rearward from the vehicle and a sixth antenna array having a sixth beam pattern facing the rear-right direction of the vehicle; and the fourth substrate comprises a seventh antenna array having a seventh beam pattern facing rightward from the vehicle.

6. The apparatus of claim 5, wherein:

an arrival distance of the fifth beam pattern is greater than each of an arrival distance of the sixth beam pattern and an arrival distance of the seventh beam pattern; and each of a central angle of the sixth beam pattern and a central angle of the seventh beam pattern is greater than a central angle of the fifth beam pattern.

7. The apparatus of claim 6, wherein at least a part of the sixth beam pattern overlaps the seventh beam pattern.

8. The apparatus of claim 6, wherein a viewing angle of the second antenna is greater than each of the central angle of the sixth beam pattern and the central angle of the seventh beam pattern and smaller than a sum of the central angle of the sixth beam pattern and the central angle of the seventh beam pattern.

9. The apparatus of claim 6, wherein a viewing angle of the first antenna is 180 degrees or more.

10. An apparatus comprising:

a radar configured to provide information on an object around a vehicle; and a controller configured to control at least one of a driving system, a braking system, and a steering system of the vehicle on the basis of the information on the object, wherein the radar comprises:

a first antenna installed at a right rear side of the vehicle, having rearward and rightward sensing areas of the vehicle, and configured to obtain first radar data, a second antenna installed at a left rear side of the vehicle, having rearward and leftward sensing areas of the vehicle, and configured to obtain second radar data, and a processor configured to obtain information on the object around the vehicle on the basis of processing at least one of the first radar data or the second radar data, wherein the first antenna comprises a first substrate facing a rear-right direction of the vehicle and a second substrate facing rightward from the vehicle, and wherein the second antenna comprises a third substrate facing a rear-left direction of the vehicle and a fourth substrate facing leftward from the vehicle, wherein the first substrate comprises:

a second antenna array having a second beam pattern facing the rear-right direction of the vehicle, wherein the second substrate comprises:

a third antenna array having a third beam pattern facing rightward from the vehicle, wherein at least a part of the second beam pattern overlaps the third beam pattern, wherein:

the first substrate comprises a first antenna array having a first beam pattern facing rearward from the vehicle;

the third substrate comprises a fourth antenna array having a fourth beam pattern facing rearward from the vehicle and a fifth antenna array having a fifth beam pattern facing the rear-left direction of the vehicle;

the fourth substrate comprises a sixth antenna array having a sixth beam pattern facing leftward from the vehicle; and at least a part of the fifth beam pattern overlaps the sixth beam pattern.

11. The apparatus of claim 10, wherein:

an arrival distance of the first beam pattern is greater than each of an arrival distance of the second beam pattern and an arrival distance of the third beam pattern; and an arrival distance of the fourth beam pattern is greater than an arrival distance of the fifth beam pattern.

12. The apparatus of claim 10, wherein a viewing angle of the first antenna is greater than each of a central angle of the second beam pattern and a central angle of the third beam pattern and smaller than a sum of the central angle of the second beam pattern and the central angle of the third beam pattern.

13. The apparatus of claim 10, wherein the radar further comprises:

a third antenna installed at a front side of the vehicle, having a forward sensing area of the vehicle, and configured to obtain third radar data; and another processor configured to obtain information on the object around the vehicle on the basis of processing the third radar data, wherein the third antenna comprises a fifth substrate facing a front-right direction of the vehicle and a sixth substrate facing a front-left direction of the vehicle.

14. The apparatus of claim 13, wherein:

the fifth substrate comprises a seventh antenna array having a seventh beam pattern facing forward from the vehicle and an eighth antenna array having an eighth beam pattern facing the front-right direction of the vehicle; and the sixth substrate comprises a ninth antenna array having a ninth beam pattern facing forward from the vehicle and a tenth antenna array having a tenth beam pattern facing the front-left direction of the vehicle.

15. The apparatus of claim 10, further comprising:

a fourth antenna installed at a front right side of the vehicle, having a front-right sensing area of the vehicle, and configured to obtain fourth radar data; and a fifth antenna installed at a front left side of the vehicle, having a front-left sensing area of the vehicle, and configured to obtain fifth radar data.

* * * * *